(12) United States Patent
Yokoyama

(10) Patent No.: US 7,270,271 B2
(45) Date of Patent: Sep. 18, 2007

(54) IMAGE FORMING APPARATUS, OPERATION HISTORY STORAGE METHOD AND CONTROL METHOD, AND STORAGE MEDIUM

(75) Inventor: Noboru Yokoyama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 282 days.

(21) Appl. No.: 11/011,213

(22) Filed: Dec. 13, 2004

(65) Prior Publication Data
US 2005/0139673 A1    Jun. 30, 2005

(30) Foreign Application Priority Data
Dec. 24, 2002   (JP) .............................. 2003-427702

(51) Int. Cl.
*G06K 7/14* (2006.01)
(52) U.S. Cl. ....................................... 235/454; 235/385
(58) Field of Classification Search ................ 235/454, 235/382, 385, 487, 492
See application file for complete search history.

(56) References Cited

U.S. PATENT DOCUMENTS

| | | | | |
|---|---|---|---|---|
| 5,204,936 A | * | 4/1993 | Kaneko et al. ............... | 706/10 |
| 5,629,981 A | * | 5/1997 | Nerlikar ..................... | 713/168 |
| 6,421,653 B1 | * | 7/2002 | May ......................... | 705/36 R |
| 6,727,999 B1 | * | 4/2004 | Takahashi .................. | 358/1.15 |
| 6,876,825 B2 | * | 4/2005 | Kurahashi et al. ............ | 399/82 |
| 6,952,278 B2 | | 10/2005 | Miyahara et al. .......... | 358/1.15 |
| 2004/0105120 A1 | | 6/2004 | Yokoyama ................. | 358/1.15 |

FOREIGN PATENT DOCUMENTS

| | | | |
|---|---|---|---|
| JP | 402240739 | * | 9/1990 |
| JP | 406215043 | * | 8/1994 |
| JP | 8-18774 | | 1/1996 |
| JP | 11-341212 | | 12/1999 |
| JP | 2002/305646 | | 10/2002 |
| JP | 2003/178285 | | 6/2003 |
| JP | 2003-224696 | | 8/2003 |

OTHER PUBLICATIONS

Nikkei Research Report, 2003-II. http://www.nikkei-r.co.jp/report/0302/04cvs.pdf.

* cited by examiner

*Primary Examiner*—Daniel Stcyr
(74) *Attorney, Agent, or Firm*—Fitzpatrick, Cella, Harper & Scinto

(57) ABSTRACT

In order to realize both the security and convenience upon using the image forming apparatus, whether or not to store an operation history is selected for each operation mode. A desired one of a plurality of operation modes is designated. When the designated operation mode is selected to store the operation mode, the operation history is stored in accordance with the operation of the operation mode.

27 Claims, 20 Drawing Sheets

F I G. 2
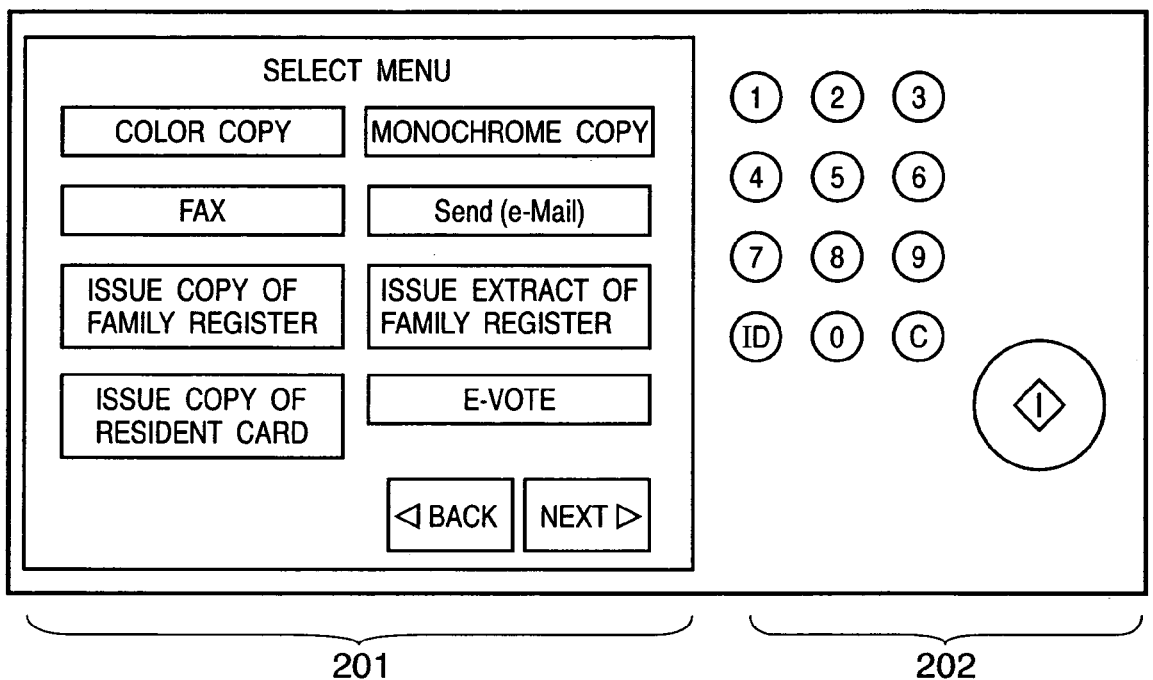

FIG. 11A

SET LOG ITEM TO BE RECORDED [level 1]

- PROCESSING START TIME
- PROCESSING END TIME
- PROCESSING RESULT
- ERROR INFORMATION
- PRINT CONDITION
- FINISHING CONDITION
- RECORDING (SPECIAL) SHEET DESIGNATION
- NUMBER OF OUTPUT SHEETS

[OK] [CANCEL]  [◁ BACK] [NEXT ▷]

SET LOG ITEM TO BE RECORDED [level 1]

- USER NAME (ID)
- MAIL ADDRESS
- FAX DESTINATION TELEPHONE NUMBER
- ACCESSED URL
- TRANSMISSION DATA SIZE
- RECEPTION DATA SIZE
- . . .
- SHIFT TO ADMINISTRATOR MODE

[OK] [CANCEL]  [◁ BACK] [NEXT ▷]

SET LOG ITEM TO BE RECORDED [level 3]

- ⊙ PROCESSING START TIME
- ⊙ PROCESSING END TIME
- ⊙ PROCESSING RESULT
- ⊙ ERROR INFORMATION
- ○ PRINT CONDITION
- ○ FINISHING CONDITION
- ○ RECORDING (SPECIAL) SHEET DESIGNATION
- ○ NUMBER OF OUTPUT SHEETS

| OK | CANCEL | ◁ BACK | NEXT ▷ |

FIG. 13B

SET LOG ITEM TO BE RECORDED [level 3]

- ○ USER NAME (ID)
- ○ MAIL ADDRESS
- ○ FAX DESTINATION TELEPHONE NUMBER
- ○ ACCESSED URL
- ○ TRANSMISSION DATA SIZE
- ○ RECEPTION DATA SIZE
- ○ . . .
- ○ SHIFT TO ADMINISTRATOR MODE

| OK | CANCEL | ◁ BACK | NEXT ▷ |

FIG. 15A

SET LOG ITEM TO BE RECORDE
[ISSUE COPY OF RESIDENT CARD]

- ⦿ PROCESSING START TIME
- ⦿ PROCESSING END TIME
- ⦿ PROCESSING RESULT
- ⦿ ERROR INFORMATION
- ○ PRINT CONDITION
- ○ FINISHING CONDITION
- ⦿ RECORDING (SPECIAL) SHEET DESIGNATION
- ○ NUMBER OF OUTPUT SHEETS

| OK | CANCEL | ◁ BACK | NEXT ▷ |

FIG. 15B

SET LOG ITEM TO BE RECORDE
[ISSUE COPY OF RESIDENT CARD]

- ⦿ USER NAME (ID)
- ○ MAIL ADDRESS
- ○ FAX DESTINATION TELEPHONE NUMBER
- ⦿ ACCESSED URL
- ○ TRANSMISSION DATA SIZE
- ○ RECEPTION DATA SIZE
- ○ . . .
- ⦿ SHIFT TO ADMINISTRATOR MODE

| OK | CANCEL | ◁ BACK | NEXT ▷ |

F I G. 18

SET LOG ITEM TO BE RECORDED

⦿ USER NAME (ID)   ○ MAIL ADDRESS

○ FAX DESTINATION   ⦿ ACCESSED URL
   TELEPHONE NUMBER

○ TRANSMISSION    ○ RECEPTION
   DATA SIZE         DATA SIZE

⦿ IC CARD         ⦿ SHIFT TO
   INFORMATION       ADMINISTRATOR
   1801              MODE

| OK | CANCEL | | ◁ BACK | NEXT ▷ |

IMAGE FORMING APPARATUS, OPERATION HISTORY STORAGE METHOD AND CONTROL METHOD, AND STORAGE MEDIUM

FIELD OF THE INVENTION

The present invention relates to a technique for storing the operation history of an image forming apparatus.

BACKGROUND OF THE INVENTION

Nowadays, the IT (Information Technology) innovations have advanced in respective fields, and transition to e-government is making steady progress.

Meanwhile, image forming apparatuses such as copying machines and the like are equipped in various places such as convenience stores and the like.

Some answers to questionnaires indicate that application and reception of resident cards and the like are good services, although such services are not provided in convenience stores yet. However, how to provide such services in practice has not been examined yet (e.g., HTTP://www.nikkei-r.co.jp/report/0302/04cvs.pdf).

Under the circumstances, it will be convenient to access and output public documents using image forming apparatuses equipped in convenience stores and the like.

However, in terms of the nature of such documents, illicit acts such as illicit access to such documents and the like must be adequately monitored. As a method of monitoring, a log (operation history) as traces of illicit access is recorded. However, log recording executed in a conventional copying machine or the like can only always automatically record fixed items (e.g., those which contribute to maintenance), which were set upon factory shipment.

Furthermore, log recording cannot directly prevent illicit acts themselves since it aims at saving traces of illicit acts.

The aforementioned method that always record fixed items unnecessarily increases log records. This means that most of a storage device may be consumed by log recording. As a result, the recording capacity is liable to be short, thus decreasing the productivity for respective operations.

SUMMARY OF THE INVENTION

It is an object of the present invention to solve the aforementioned problems.

It is another object of the present invention to provide some sense of security to authentic users upon using an image forming apparatus and to deter use of an image forming apparatus by illicit users.

It is still another object of the present invention to achieve both high security and convenience upon using an image forming apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 depicts a console 113 according to the embodiment of the present invention;

FIGS. 11A, 11B, 12A, 12B, 13A and 13B show examples of recording item setting windows for respective levels according to the embodiment of the present invention;

FIGS. 15A and 15B show examples of a log item setting window according to the embodiment of the present invention;

FIG. 18 shows an example of a log item setting window according to the embodiment of the present invention;

DETAILED DESCRIPTION OF THE PREFERRED EMBODIMENTS

Preferred embodiments which help to understand the superordinate, middle, and subordinate concepts of the present invention will be described hereinafter. Note that all of the concepts included in the following embodiments are not always described in the claims. However, such concepts are not excluded on purpose from the scope of the claims; they are not described in the claims since they have an equivalent relationship to the claims.

First Embodiment

Figure 1:
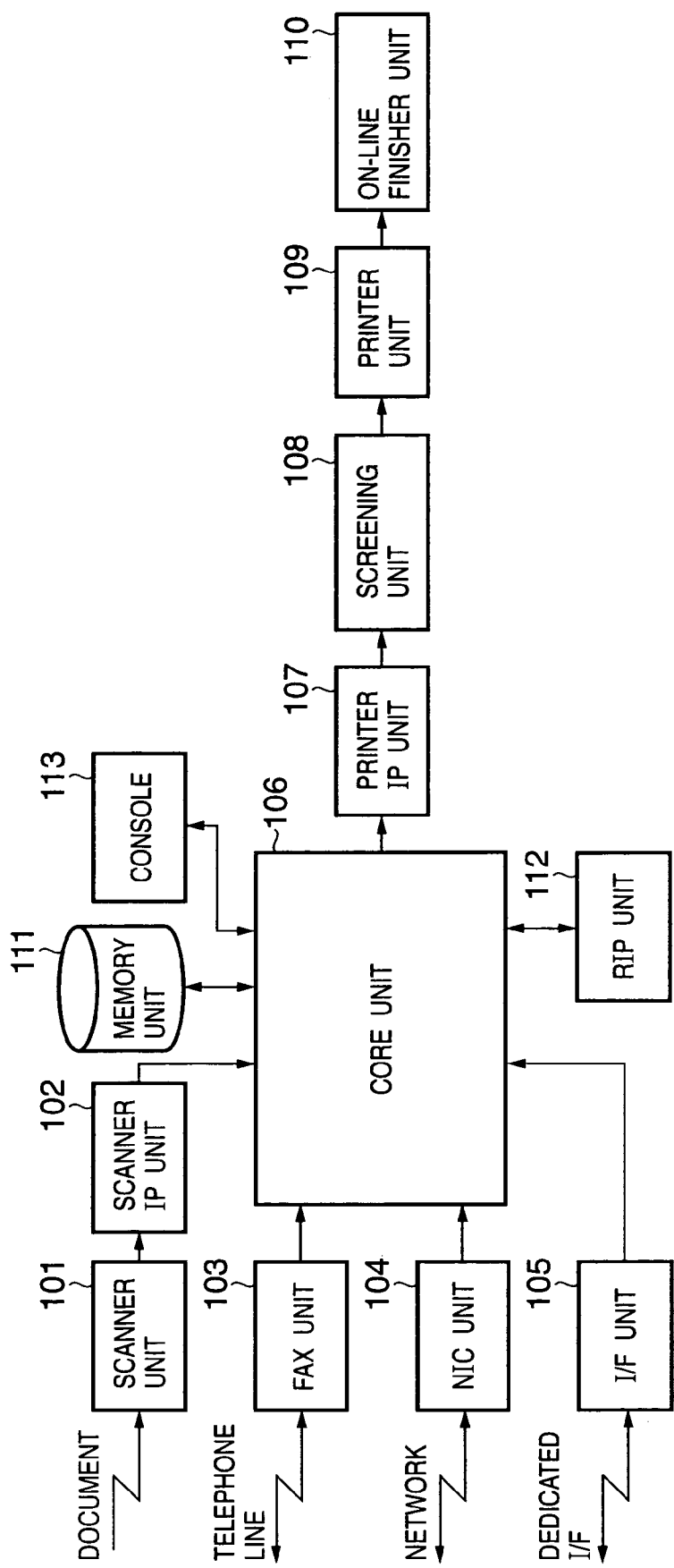
FIG. 1 is a block diagram showing an example of an image forming apparatus according to an embodiment of the present invention.

FIG. 1 is a block diagram showing an example of an image forming apparatus according to the embodiment of the present invention. The image forming apparatus comprises a scanner unit 101 for scanning an image, a scanner IP (Image Processor) unit 102 for applying an image process to the scanned image data, a FAX unit 103 (e.g., a facsimile) for executing an image transmission/reception process using a telephone line, an NIC (Network Interface Card) unit 104 for transmitting/receiving image data, apparatus information, and the like via a network, and a dedicated I/F unit 105 for transmitting/receiving various kinds of information by connecting another image forming apparatus. A core unit 106 makes various kinds of control according to control programs stored in a memory unit 111. For example, the core unit 106 temporarily stores an image signal in collaboration with the memory unit 111, determines the route of an image signal, compresses/expands transmission/reception data, and executes input control and display control of a console 113 in accordance with the use method of the image forming apparatus. The core unit 106 comprises a CPU and the like, and the memory unit 111 comprises a ROM, RAM, hard disk drive, and the like.

Image data output from the core unit 106 is sent to a printer unit 109 that makes image formation via a printer IP unit 107 and screening unit 108. The printer IP unit 107 includes color and monochrome image processors. The color image processor of the printer IP unit 107 executes a masking process for converting input M1, C1, and Y1 signals into C, M, Y, and K signals as toner colors of the image forming apparatus by matrix operations, and applies gamma correction to these signals, thus converting them into C, M, Y, and K data for image output. The color image processor applies a spatial filter (sharpness, smoothing, or the like) to C, M, Y, and K data. The monochrome image processor of the printer IP unit 107 skips a masking process, and executes a binarization process after a spatial filter. The screening unit 108 receives color-separated image data (monochrome data in case of an monochrome image), generates pulse width signals in accordance with the image data, and converts them into laser beams of respective colors. The printer unit 109 scans and exposes a photosensitive drum with the laser beams to form toner images on the photosensitive drum, and transfers the toner images onto a sheet. Note that the present invention can be equally applied to other printing systems such as an ink-jet system and the like.

Sheets printed out by the printer unit 109 are fed to an on-line finisher unit 110 and undergo a sheet sorting process and sheet finishing process.

An RIP (Raster Image Processor) unit 112 executes a rasterization process for rasterizing PDL data input from the NIC unit 104 into a bitmap image as needed. The console 113 is an input/output device which allows the operator to input instructions to the image forming apparatus and displays information for the operator.

FIG. 2 depicts the console 113 according to this embodiment. The control 113 includes an LCD (liquid crystal display) unit 201 with a touch panel input device, and a key operation unit 202. The LCD unit 201 in FIG. 2 displays a window which is of help when the operator selects one of operation modes. The operation modes shown in FIG. 2 include operation modes which require a print process such as a color copy mode, a monochrome copy mode, an issuance mode of a copy of the family register, an issuance mode of an extract of the family register, an issuance mode of a copy of the resident card, and the like, operation modes which transmit input image data to an external apparatus such as a FAX mode, an e-mail mode, and the like, an e-voting mode for erections, and the like.

Figure 3:
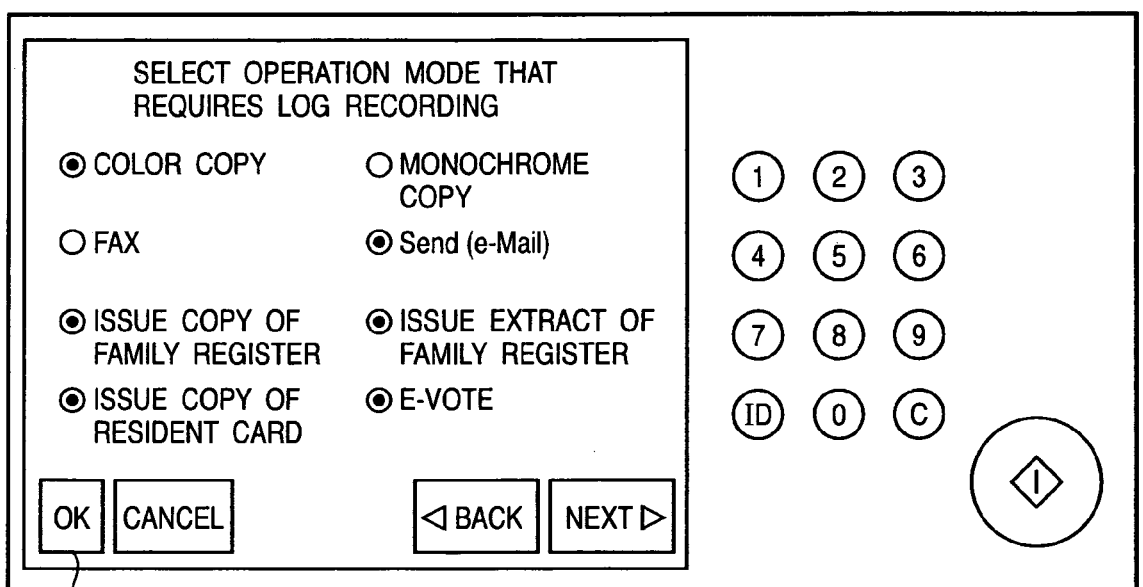
FIG. 3 shows an example of a log recording setting window according to the embodiment of the present invention.

FIG. 3 shows an example of a log recording setting window according to the embodiment. This setting window is used to select ones that require log recording of a plurality of operation modes of the image forming apparatus. A characteristic feature of this window lies in that ON/OFF of log recording can be set for each operation mode. This window is displayed when an administrator who administrates the image forming apparatus makes a specific operation or inputs a password from the key operation unit 202.

When the administrator touches a portion of an operation mode, a log of which is to be recorded, the console 113 outputs an operation signal to the core unit 106. The core unit 106 specifies an operation mode corresponding to the operation signal, and changes the color of a check box (a circular mark displayed on the left side of each operation mode name in FIG. 3) of the specified operation mode from black to white or vice versa. When the circular mark is black, this means that a log will be recorded upon executing the corresponding operation mode; when it is white, this means that no log will be recorded. In the example of FIG. 3, it is set to record logs except for the FAX mode and monochrome copy mode. Upon detection of depression of an OK button 301 on the lower left portion of the window, the core unit 106 generates setting information used to manage ON/OFF of log recording for respective operation modes, stores it in the memory unit 111, and returns to the previous window in FIG. 2. Various formats of the setting information may be used. If the total number of operation modes is eight, the setting information can be expressed by 8 bits in the simplest format. That is, if "1" is defined as log recording=ON and "0" is defined as log recording=OFF, the setting information can be expressed like "10011111". In this case, correspondence between the bit positions and operation modes must be determined in advance.

In this manner, since ON/OFF of log recording can be freely set for respective operation modes, the administrator can make setups according to the security policy.

Figure 4:
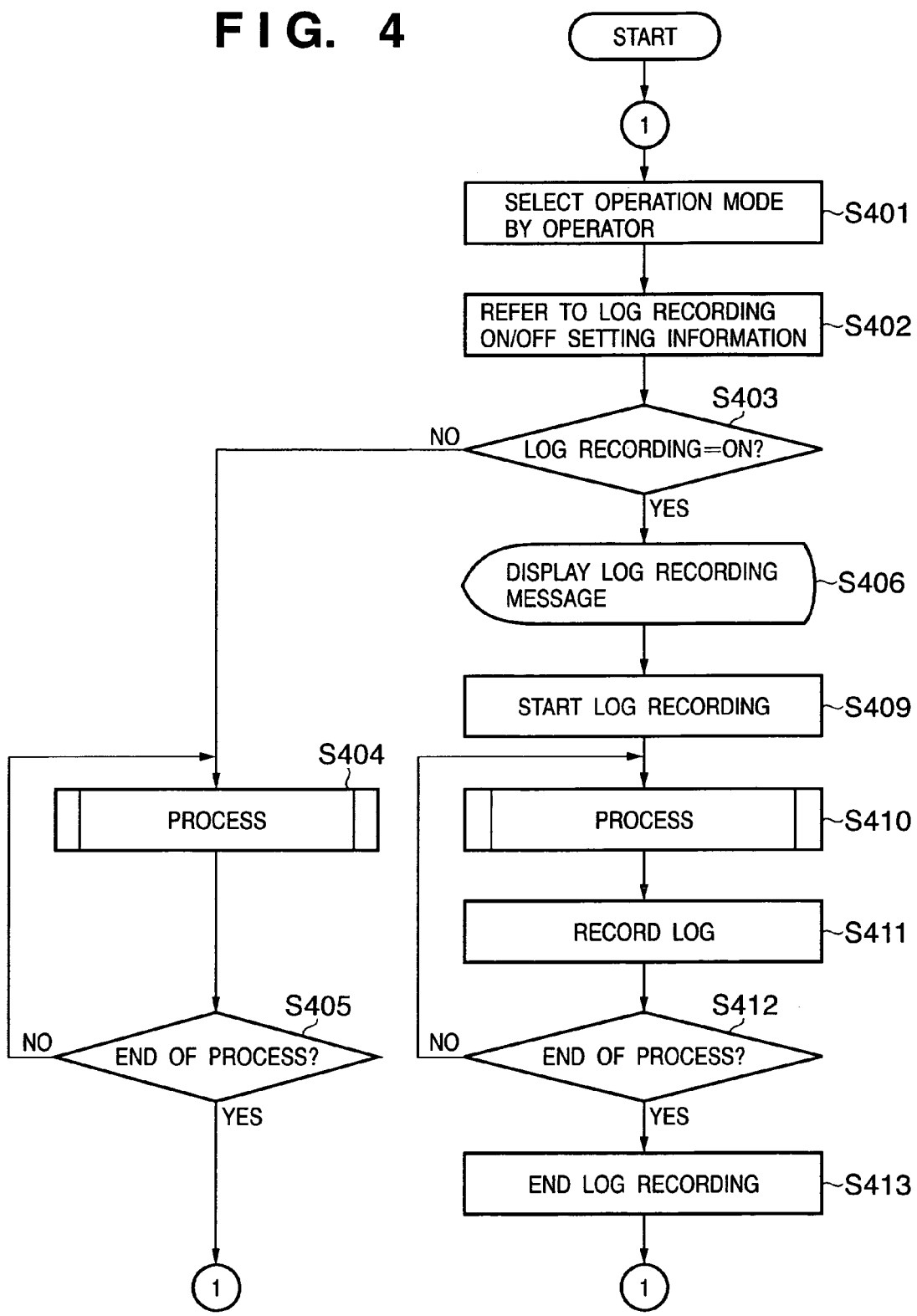
FIG. 4 is a flowchart showing an example of processes associated with selection of an operation mode and log recording according to the embodiment of the present invention.

FIG. 4 is a flowchart showing an example of processes associated with selection of an operation mode and log recording according to the embodiment. This example shows the flow from when the operator selects an operation mode until the process corresponding to the selected operation mode ends.

In step S401, the core unit 106 detects an operation signal from the console 113 and recognizes an operation mode designated by the operator. In step S402, the core unit 106 refers to the log recording setting information for respective operation modes stored in the memory unit 111.

The core unit 106 checks in step S403 based on the setting information referred to in step S402 if log recording of the recognized operation mode is required. If no log recording is required, the flow branches to step S404, and the core unit 106 executes all processes associated with the recognized operation mode. The core unit 106 checks in step S405 if all the processes are complete. If all the processes are complete, the flow returns to step S401 to wait for the next operation of the operator. On the other hand, if processes to be executed still remain, the flow returns to step S404. On the other hand, if the core unit 106 determines in step S403 that log recording is required, the flow advances to step S406. In step S406, the core unit 106 displays on the LCD unit 201 a message that gives the operator a warning that a log is to be recorded.

Figure 5:
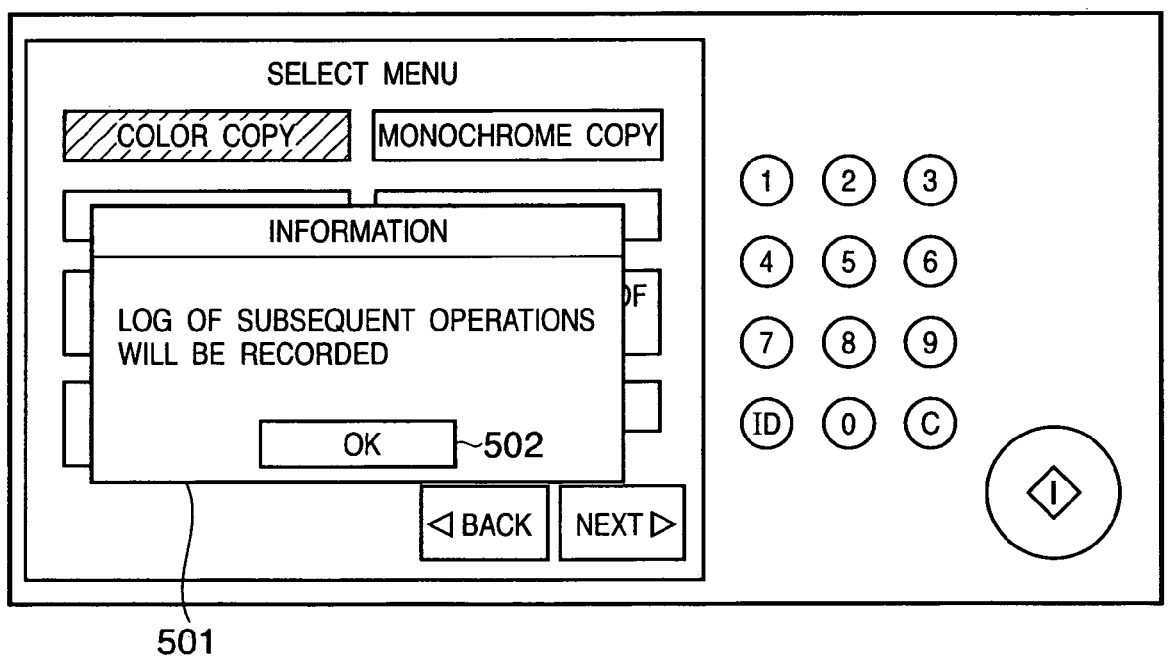
FIG. 5 shows a display example of a message that informs an operator the fact that a log will be recorded, according to the embodiment of the present invention.

FIG. 5 shows a display example of a message that informs the operator that a log is to be recorded. A dialog box 501 displayed under the display control of the core unit 106 includes a warning message and an OK button 502. Upon detection of depression of the OK button 502, the dialog box 501 is closed, and the selected operation mode can be executed. When the core unit 106 controls to inhibit execution of the selected operation mode until the operator presses the OK button 502, it can strongly remind the operator of the fact that a log will be recorded.

FIG. 5 will be described in detail below. This display example is made when the setup shown in FIG. 3 is made and the operator selects the color copy mode on the window shown in FIG. 2. That is, since the color copy mode is an operation mode with log recording=ON, a warning message "a log of subsequent operations is to be recorded" is displayed.

If the monochrome copy mode is selected, the subsequent processes are executed without displaying any message (steps S404 and S405). This is because the monochrome copy mode is an operation mode set with log recording=OFF (FIG. 3).

In step S409, the core unit 106 starts log recording by, e.g., opening a file required to record a log. After that, in step S410 the core unit 106 executes a process associated with the recognized operation mode. In step S411, the core unit 411 records a log in association with the executed process. The core unit 106 checks in step S412 if all processes associated with the recognized operation mode are complete. If all the processes are complete, the flow advances to step S413, and the core unit 106 ends log recording by, e.g. closing the file.

Note that items which are to undergo log recording include, e.g., the operation name, time, error information, processing end status, and the like, and are common to all operation modes.

As described above, according to the first embodiment, since the operator can select operation modes with log recording=ON and those with log recording=OFF of a plurality of operation modes, the log recording amount can be reduced compared to the method of recording logs of all operation modes.

Also, logs of only operation modes of administrator's choice can be recorded in consideration that operation modes whose logs are to be recorded change depending on the installation environments of the image forming apparatuses.

Furthermore, since a message which informs that a log is to be recorded is displayed upon executing the selected operation mode, an ill-intentioned operator, who is about to misbehave with or without the knowledge that a log will be recorded, can recognize or re-recognize that a log will be recorded. As a result, an effect of deterring such ill-intentioned operator from making illicit acts can be expected.

On the other hand, the message can give a well-intentioned operator a sense of security. For example, even when some problem has occurred during the process, the log can provide evidence that such problem is not posed due to illicit operations of the operator.

As described above, in the image forming apparatus which has a plurality of operation modes at least including operation modes that require a print process of input image data, and operation modes that transmit input data to an external apparatus, for example, when the operator designates an operation mode to be executed via the console 113, a control unit of this embodiment (the core unit 106 is adopted as the control unit in the above description, but other control units may be used) controls to notify the operator via the display unit 201 of the console 113 of a message indicating that log information is to be recorded. When the operator inputs an input signal that he or she agrees with the message indicating that log information is to be recorded via the console 113, the control unit may control to permit execution of the designated operation mode. On the other hand, when the operator does not agree with the message indicating that log information is to be recorded (when a signal other than a signal indicating agreement is input), the control unit may proceed to inhibit execution of the designated operation mode.

As a method of notifying the message indicating that a log is to be recorded and its agreement method, for example, when the operator designates an operation mode to be executed via the console 113, the control unit controls the console 113 to execute a first display process that notifies the operator of a message indicating that log information is to be recorded. Furthermore, when an input signal indicating agreement associated with recording of log information is input via the console 113 after the console 113 executes the first display process, the control unit permits execution of the designated operation mode. On the other hand, when no input signal indicating agreement associated with recording of log information is input via the console 113 after the console 113 executes the first display process, the control unit controls to inhibit execution of the designated operation mode (see respective display examples).

Note that the control for inhibiting execution of the operation mode in this embodiment includes a process for controlling an execution instruction itself of the designated operation mode to be uninputtable by hatching or graying out a display key used to input a setup or an execution instruction of the designated operation mode. Also, that control includes a process for making operation control to receive an execution instruction itself from the operator via the console 113 but to inhibit respective units (e.g., the scanner unit or printer unit) associated with that operation mode from executing the designated operation mode. That is, the control unit can inhibit execution of the designated operation mode by such control. In either case, any other control methods may be adopted as long as control can be made to inhibit execution of the designated operation mode when the operator is notified of the message indicating that a log will be recorded, and no agreement about log recording is obtained from the operator after the notification.

When the operator inputs an input signal indicating agreement about log recording via the console 113, execution of the designated operation mode is permitted, but that operation mode may be controlled not to be executed immediately. That is, only execution permission may be given, and the designated operation mode may be executed after an explicit execution instruction is input. In such case, when the operator inputs to cancel execution, the control unit may proceed to cancel execution of that operation mode. In this manner, the control may be made so that execution of the designated operation mode is permitted, but whether or not the operation mode is executed in practice can be determined by the operator. Also, the control unit may execute the following control. That is, after a final execution instruction is input (after, e.g., a print start key is input), the console 113 executes a display process for notifying the message indicating that a log will be recorded, and a display process for asking for that agreement, and if agreement is obtained, execution of the designation operation mode is started.

When this image forming apparatus can make data communications with an external apparatus such as a computer or the like via a communication unit (NIC unit 104, I/F unit 105, and the like) and can receive and print image data transmitted from the external apparatus, the aforementioned display control may be executed on a display unit of the computer via a printer driver or the like that runs on the computer. That is, a control unit (CPU, memory, and the like) of the computer as the external apparatus may execute the aforementioned control (including the display control, and the control associated with permission and inhibition of execution of the operation mode). Note that information required for the control is received from the image forming apparatus.

In this way, even when the image forming apparatus operates in collaboration with the external apparatus, the control unit (core unit 106) of the image forming apparatus may execute the aforementioned control (e.g., to control the console 113 of the image forming apparatus to execute the display control).

As the operation modes corresponding to log recording, for example, the control of this embodiment may be applied to not only upper-order operation modes such as a copy mode, facsimile mode, printer mode, and the like of the image forming apparatus, but also various lower-order operation modes such as detailed modes (color copy, monochrome copy, and layout copy) included in the copy mode and the like. In any case, the control of this embodiment can be applied to any other operation modes as long as a log is to be recorded, and the problems of the prior arts can be solved by notifying the operator of a message indicating that a log will be recorded.

The aforementioned technical idea can be similarly applied to embodiments to be described later. In this manner, the above and following embodiments allow various modifications and applications without departing from the scope of the invention.

Second Embodiment

Figure 6:
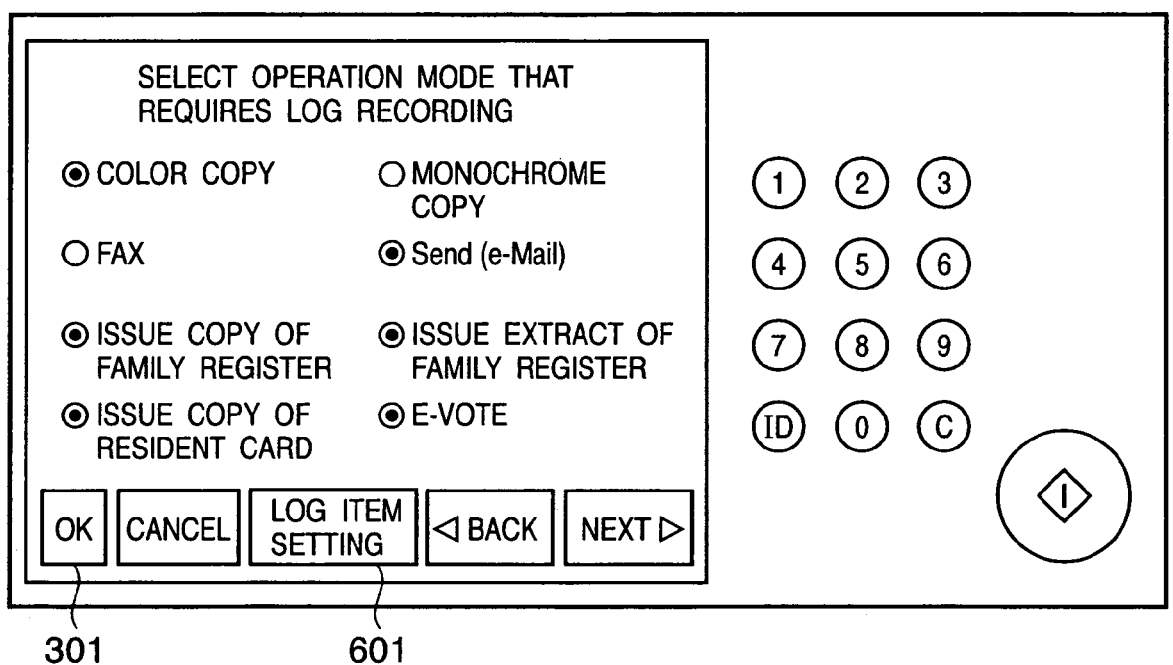
FIG. 6 shows an example of a log recording setting window according to the embodiment of the present invention.

In the first embodiment, common fixed items are recorded as a log independently of the operation modes. Hence, the second embodiment allows to freely designate items to be recorded as a log. FIG. 6 shows an example of a log recording setting window according to the second embodiment. Note that a description of items common to the above embodiment will be omitted.

Compared to the log setting window shown in FIG. 3, a "log item setting button" 601 is added to the lower center of the window. Upon detection of depression of this log item setting button 601, the core unit 106 displays a setting window (FIGS. 7A and 7B) as items to be recorded as a log on the LCD unit 201. Upon detection of depression of an OK button 301 on the lower left portion of the window, log recording setting information for each operation mode is stored in the memory unit 111, and the window shown in FIG. 2 is returned.

Figure 7A:
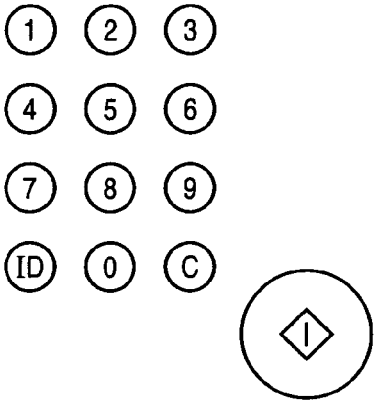
FIGS. 7A and 7B show examples of a log item setting window according to the embodiment of the present invention.
Figure 7B:
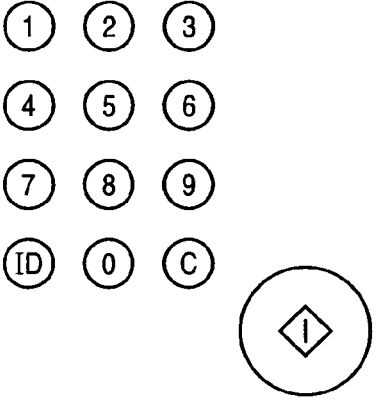

FIGS. 7A and 7B show an example of the log item setting window according to this embodiment. This window is displayed on the LCD unit 201 by the core unit 106 upon detection of depression of this log item setting button 601. If there are many items to be selected, a setting window of all items cannot often be displayed at once. Hence, the item setting window is divided into two windows like windows in FIG. 7A and FIG. 7B. A "next" button 701 and "back" button 702 are used to switch the window in FIG. 7A and windows in FIG. 7B each other.

In the example of the window shown in FIG. 7A, items such as a processing start time, processing end time, processing result, error information, print condition, finishing condition, recording (special) sheet designation, the number of output sheets, and the like can be selected.

In the example of the window shown in FIG. 7B, items such as a user name (ID or the like), a mail address, a telephone number of a FAX transmission destination, an accessed URL, a transmission data size, a reception data size, and the like can be selected.

By touching a display portion or circular mark portion of each item name on these item setting windows, the color of a circular mark (check box) on the left side of each item name changes from black to white or vice versa. This means that an item with a black circular mark is recorded as a log, and an item with a white circular mark is not recorded as a log. Upon depression of an OK button 703 on the lower left portion of the window, the core unit 106 generates item setting information indicating whether or not each item is to be recorded as a log, and stores it in the memory unit 111, thus returning to the window shown in FIG. 6. In this example, since there are 15 items, the item setting information can be formed by at least 15 bits in the same manner as described above.

Figure 8:
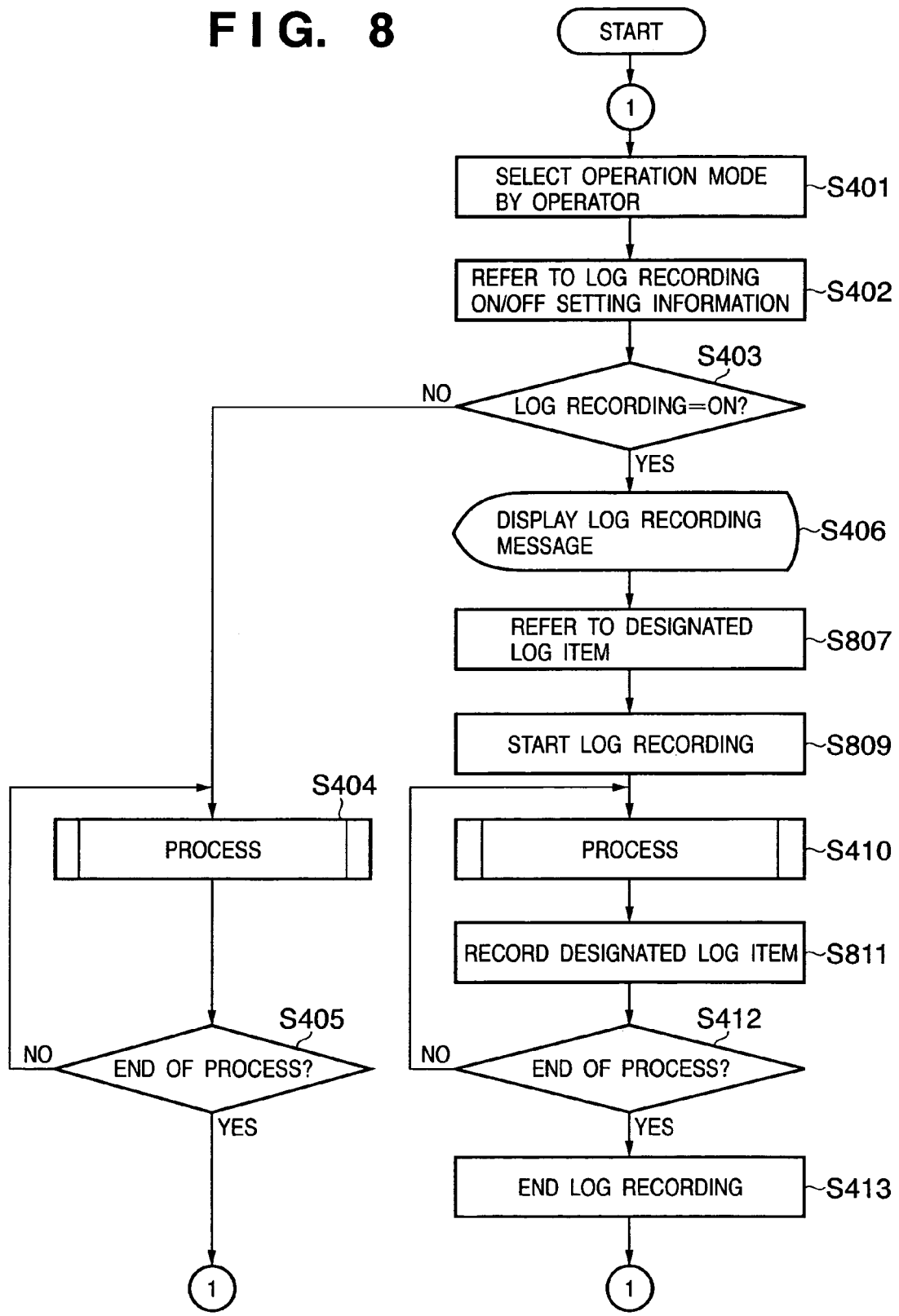
FIG. 8 is a flowchart showing an example of processes associated with selection of an operation mode and log recording according to the embodiment of the present invention.

FIG. 8 is a flowchart showing an example of processes associated with selection of an operation mode and log recording according to the second embodiment. After the message indicating that a log is to be recorded is displayed according to the aforementioned flow (steps S401 to S406), the flow advances to step S807, and the core unit 106 extracts items to be recorded with reference to the log item setting information stored in the memory unit 111.

In step S809, the core unit 106 starts log recording of the extracted items. In step S811, the core unit 106 executes processes corresponding to the operation mode, monitors items to be recorded, and records the items as a log at appropriate recording timings.

As described above, according to the second embodiment, since the administrator or the like can freely set items to be recorded as a log, the log items can be customized according to an installation environment of the image forming apparatus.

When a small number of items to be recorded as a log are set, the log recording amount can be reduced compared to the method of always recording all the items as a log. Also, the productivity drop due to log recording can be lightened.

Third Embodiment

In the second embodiment, items to be recorded can be freely changed, but any of operation modes record identical items on a log. The third embodiment allows to designate a log recording level for each operation mode. That is, a plurality of pieces of item setting information having different numbers and types of items to be recorded as a log are prepared, and the item setting information to be used can be selected for each operation mode. Note that each of the plurality of pieces of prepared item setting information will be referred to as a log recording level.

Figure 9:
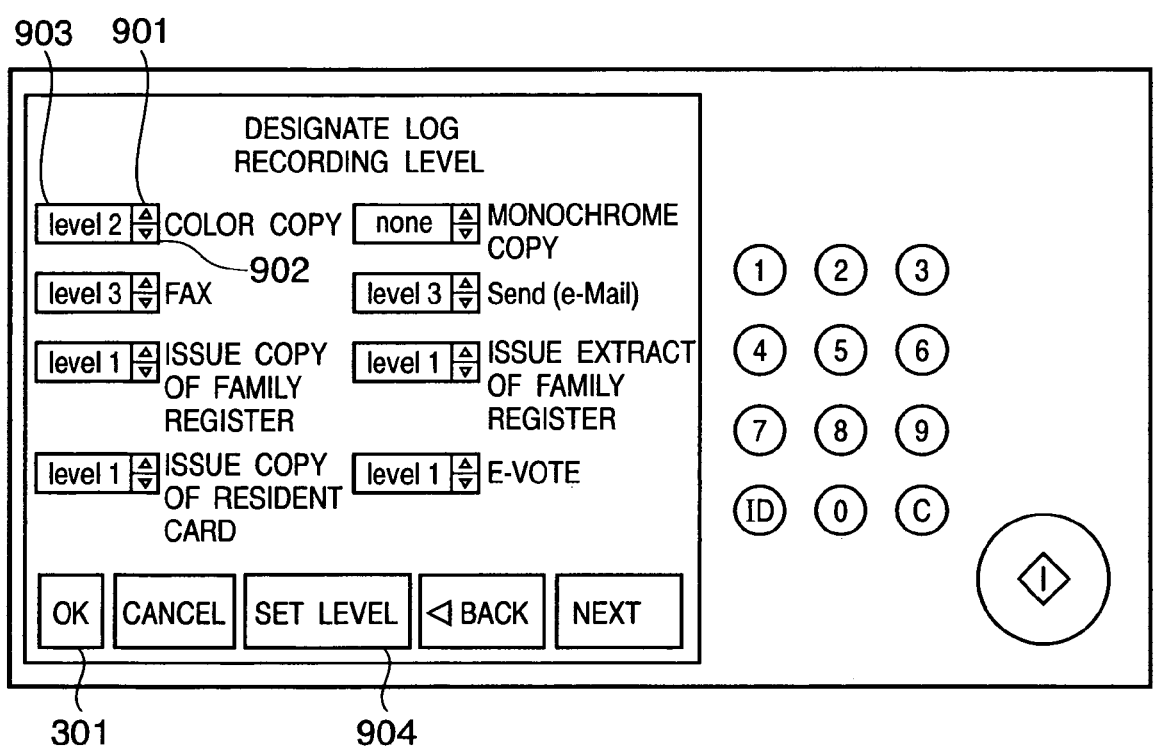
FIG. 9 shows an example of a log recording level setting window according to the embodiment of the present invention.

FIG. 9 shows an example of a log recording level setting window according to the third embodiment. In this example, a desired log recording level can be set for each operation mode. As in other setting windows, only a specific person such as the administrator or the like can display this window.

An upper triangular mark button 901 and lower triangular mark button 902 used to change the level, and a level display box 903 that displays the current setting level are displayed on the left side of each operation mode name. For example, every time depression of the upper triangular mark button 901 is detected, the core unit 106 changes the log recording level of the corresponding operation mode in the order of none (this means that no log will be recorded), level3, level2, and level1, and displays the currently selected level on the level display box 903. Upon detection of depression of the lower triangular mark button 902, the core unit 106 changes the level in the order of level1, level2, level3, and none.

Figure 10:
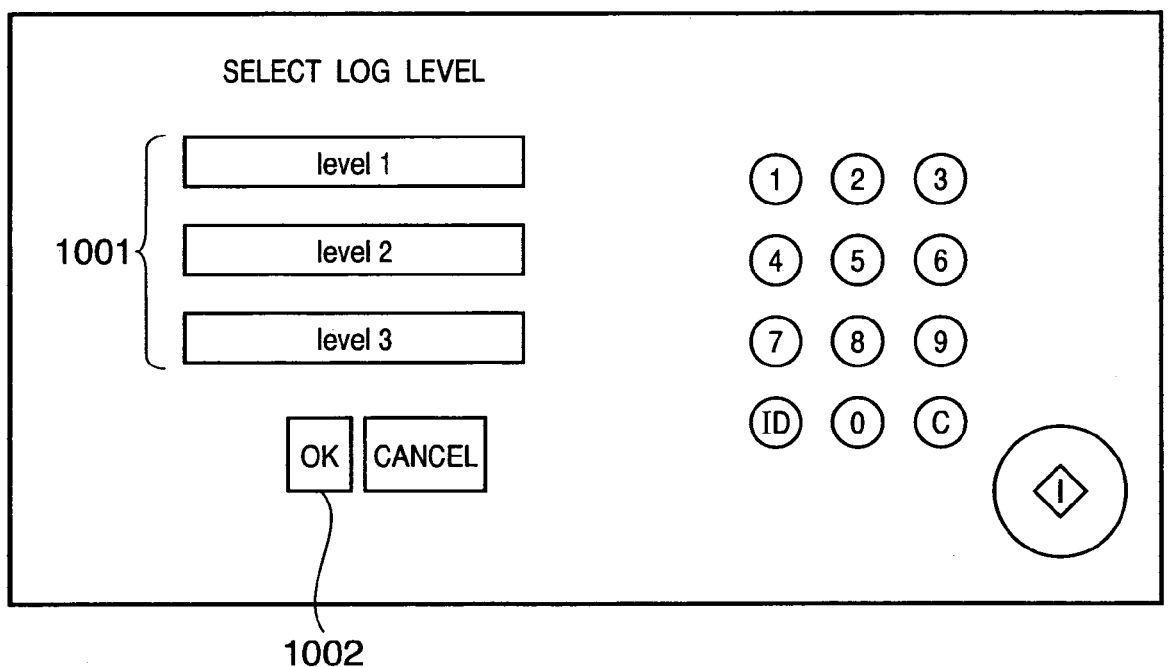
FIG. 10 shows an example of a level select window according to the embodiment of the present invention.
Figure 12A:
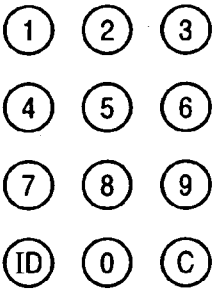
Figure 12B:
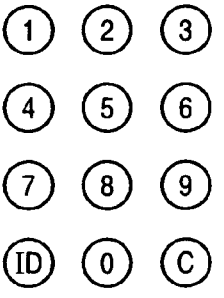

Upon detection of depression of a lower central level-dependent item setting button 904 in FIG. 9, the core unit 106 displays a level select window (FIG. 10).

FIG. 10 shows an example of a level select window according to this embodiment. Level buttons 1001 are used to select a level whose items are to be set. The administrator can change recording items for each level by pressing the log recording level button whose items to be recorded are to be changed. Upon depression of an OK button 1002 on the lower left portion of the window, the item setting information of each log recording level is stored in the memory unit 111, and the window shown in FIG. 9 returns. Unlike in other embodiments, log item setting information is independently prepared for each level.

FIGS. 11A, 11B, 12A, 12B, 13A and 13B show examples of recording item setting windows for respective levels according to this embodiment. A "next" button and "back" button are used to switch the window in FIG. 11A and windows in FIG. 11B each other. These buttons are used to switch the window in FIG. 12A and windows in FIG. 12B each other. Also, these buttons are used to switch the window in FIG. 13A and windows in FIG. 13B each other. The examples shown in FIGS. 11A and 11B, 12A and 12B, and 13A and 13B are respectively displayed upon depression of "level1", "level2", and "level3" on the window shown in FIG. 10. Basically, although the same windows as in FIGS. 7A and 7B are displayed, the administrator can recognize the level of the setting window based on "level1" or the like at the end of a title displayed on the upper portion of the window. Upon depression of an OK button 703, item setting information for log recording level level1 is stored in the memory unit 111, and the window shown in FIG. 10 returns. Note that the recording timing of item setting information may be set upon depression of the OK button 1002 or the OK button 703.

As can be seen from FIGS. 11A, 11B, 12A, 12B, 13A and 13B, the number of items of level2 is smaller than that of level1, and that of level3 is further smaller than that of level1. Such setups are of help when a level is selected according to the importance of processes for each operation mode. For example, level1 may be assigned to operation modes such as a print mode of public documents and the like (e.g., issuance of copy of the family register) when illicit acts especially pose a problem. On the other hand, level2 or level3 may be assigned to operation modes with lower importance. Also, none may be assigned to operation modes that do not require log recording.

Figure 14:
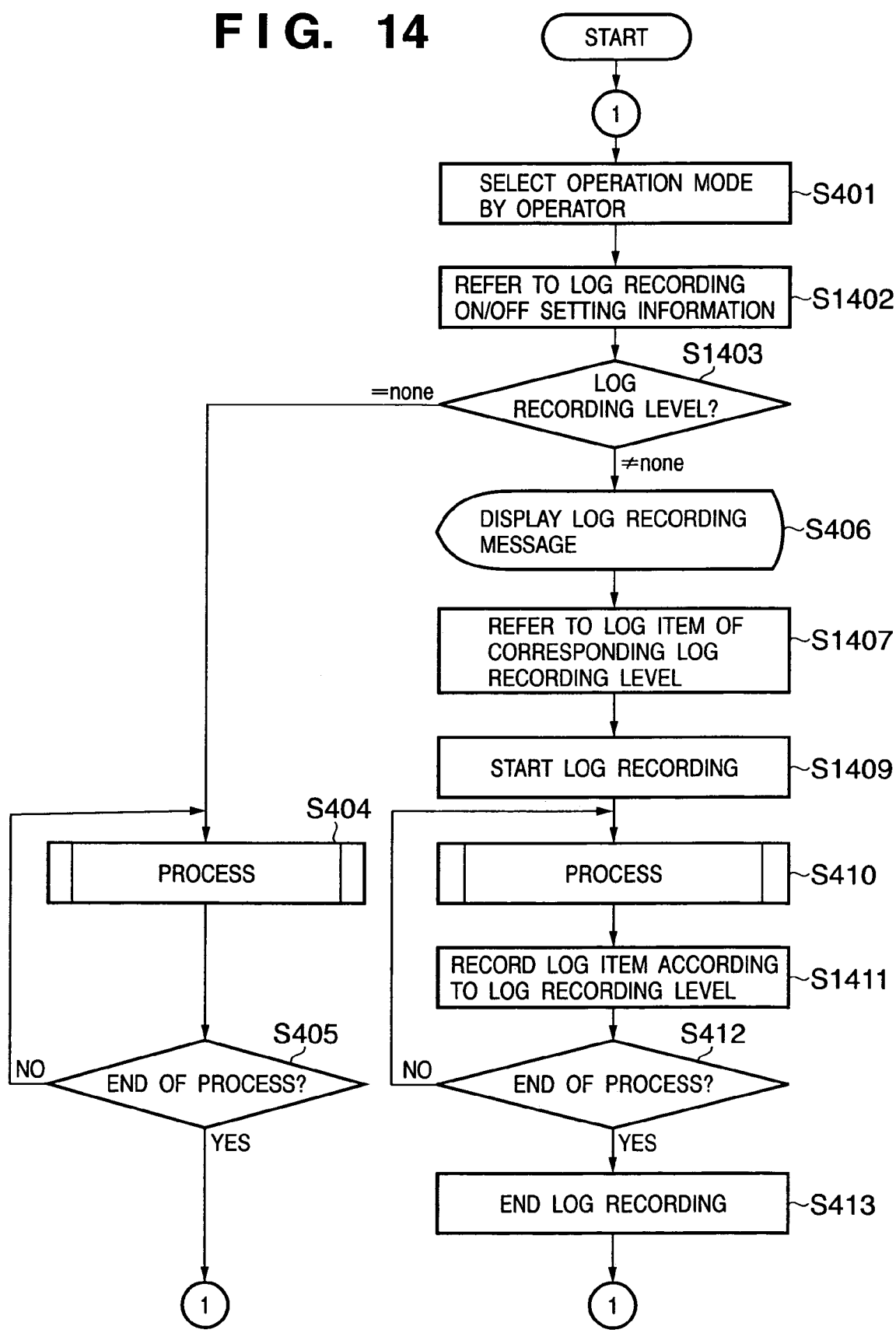
FIG. 14 is a flowchart showing an example of processes associated with selection of an operation mode and log recording according to the embodiment of the present invention.

FIG. 14 is a flowchart showing an example of processes associated with selection of an operation mode and log recording according to the third embodiment. Note that a description of the processes that have already been described will be omitted by denoting them by the same reference step numbers.

In step S1402, the core unit 106 refers to the log recording level setting information of respective operation modes stored in the memory unit 111.

In step S1403, the core unit 106 recognizes the selected operation mode on the basis of an operation signal from the console 113, and extracts a log recording level set for the recognized operation mode from the setting information referred to in step S1402. The core unit 106 then checks if the extracted log recording level is "none". If the log recording level is "none", the core unit 106 executes steps S404 and S405. On the other hand, if the log recording level is "level1" or the like, the flow advances to step S406 to display a log recording message on the LCD unit 201.

In step S1407, the core unit 106 refers to item setting information of the extracted log recording level stored in the memory unit 111. In step S1409, the core unit 106 starts log recording of items extracted with reference to the item setting information. The flow advances to step S1411 via step S410, and the core unit 106 executes processes corresponding to the operation mode, monitors items to be recorded, and records the items as a log at appropriate timings.

As described above, according to the third embodiment, items according to the log recording level, which is set in advance, can be recorded as a log for each operation mode that requires log recording. Therefore, the log recording capacity can be reduced compared to a method that records uniform items as a log for all operation modes.

This embodiment is effective when there are many operation modes and it is troublesome to independently set log recording items. More specifically, when item setups are made for some log recording levels, and are selected for each operation mode, the same effect as that upon making independent item setups for each operation mode can be obtained. Therefore, the setting load on the administrator can be reduced.

Fourth Embodiment

In the second embodiment, ON/OFF of log recording can be designated for each operation mode, and common items which are selected in advance are recorded as a log for an operation mode which is set to perform log recording. In the third embodiment, the concept called "recording level" is introduced, and common items which are selected in advance are recorded as a log for each of a plurality of groups each including at least one operation mode.

The fourth embodiment allows to independently designate items to be recorded as a log for each operation mode.

FIGS. 15A and 15B show an example of a log item setting window according to the fourth embodiment. A "next" button and "back" button are used to switch the window in FIG. 15A and windows in FIG. 15B each other. In this example, when it is detected that the operation mode "issuance of copy of resident card" has been touched on the operation mode select window in FIG. 3, the core unit 106 reads out the current setting information of the touched mode "issuance of copy of resident card", and checks if its information is set to record a log. If that information is not set to record a log, the core unit 106 displays a log recording item setting windows shown in FIGS. 15A and 15B on the LCD unit 201.

By displaying [issuance of copy of resident card] at the end of a title displayed on the upper portion of the window, it informs the administrator that this window is a setting window for "issuance of copy of resident card". Note that the setting method of respective items is as described above, but log item setting information is independently prepared for each operation mode and is stored in the memory unit 111 unlike in other embodiments.

Figure 16:
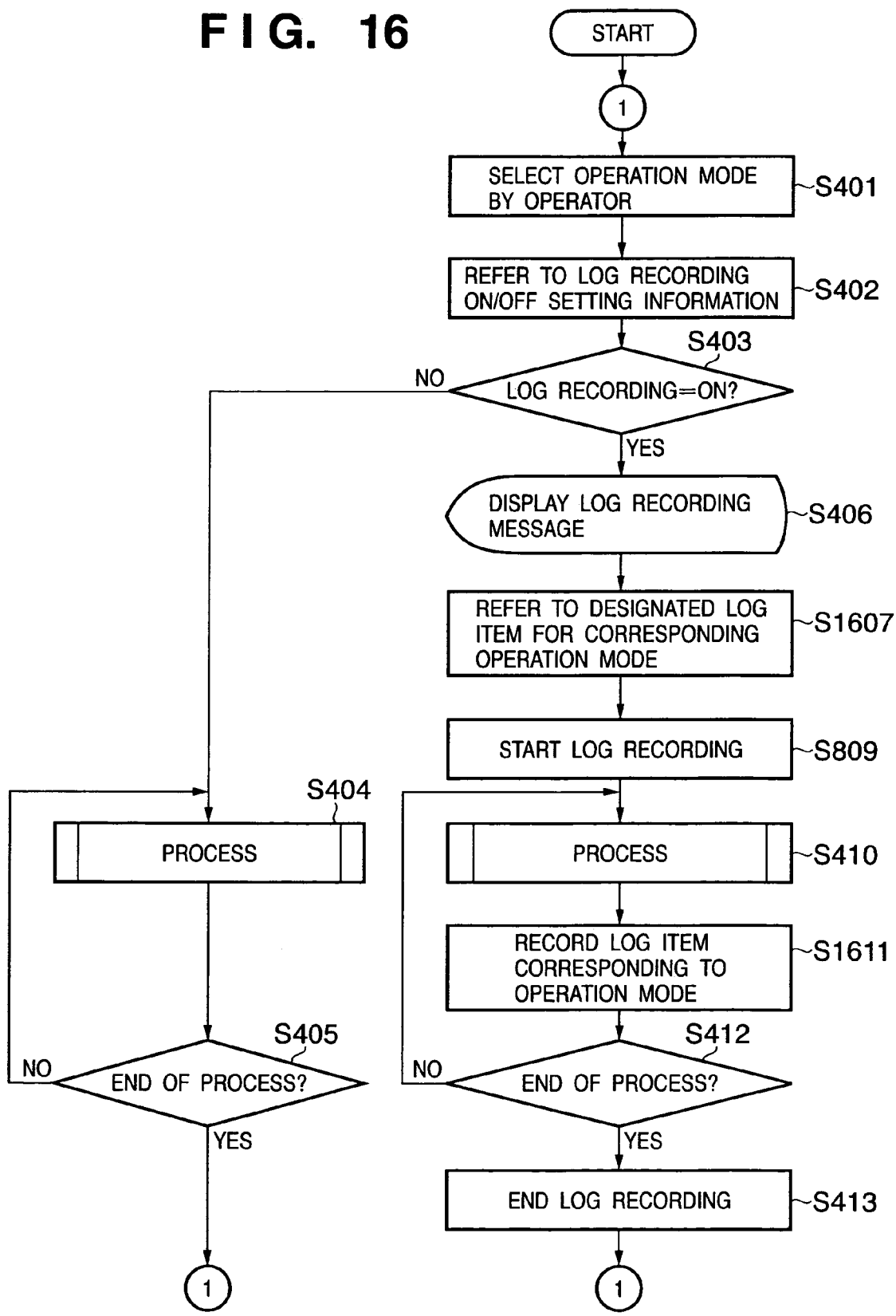
FIG. 16 is a flowchart showing an example of processes associated with selection of an operation mode and log recording according to the embodiment of the present invention.

FIG. 16 is a flowchart showing an example of processes associated with selection of an operation mode and log recording according to the fourth embodiment. A description of the processes that have already been explained will be omitted.

In step S1607, the core unit 106 determines items to be recorded as a log with reference to the log item setting information for the selected operation mode. In step S1611, the core unit 106 monitors the selected items for the operation mode in execution, and records a log.

As described above, according to the fourth embodiment, items can be independently selected for each operation mode that requires log recording. Therefore, the range of customization broadens compared to a case wherein unique items are recorded as a log for all operation modes. With some operation modes that require fewer items to be recorded, the log recording capacity can be reduced.

Fifth Embodiment

In the fifth embodiment, some of contents of an IC card (e.g., a basic resident register card or the like) are included in log recording items in an image forming apparatus which comprises an IC card I/F unit 1701.

Figure 17:
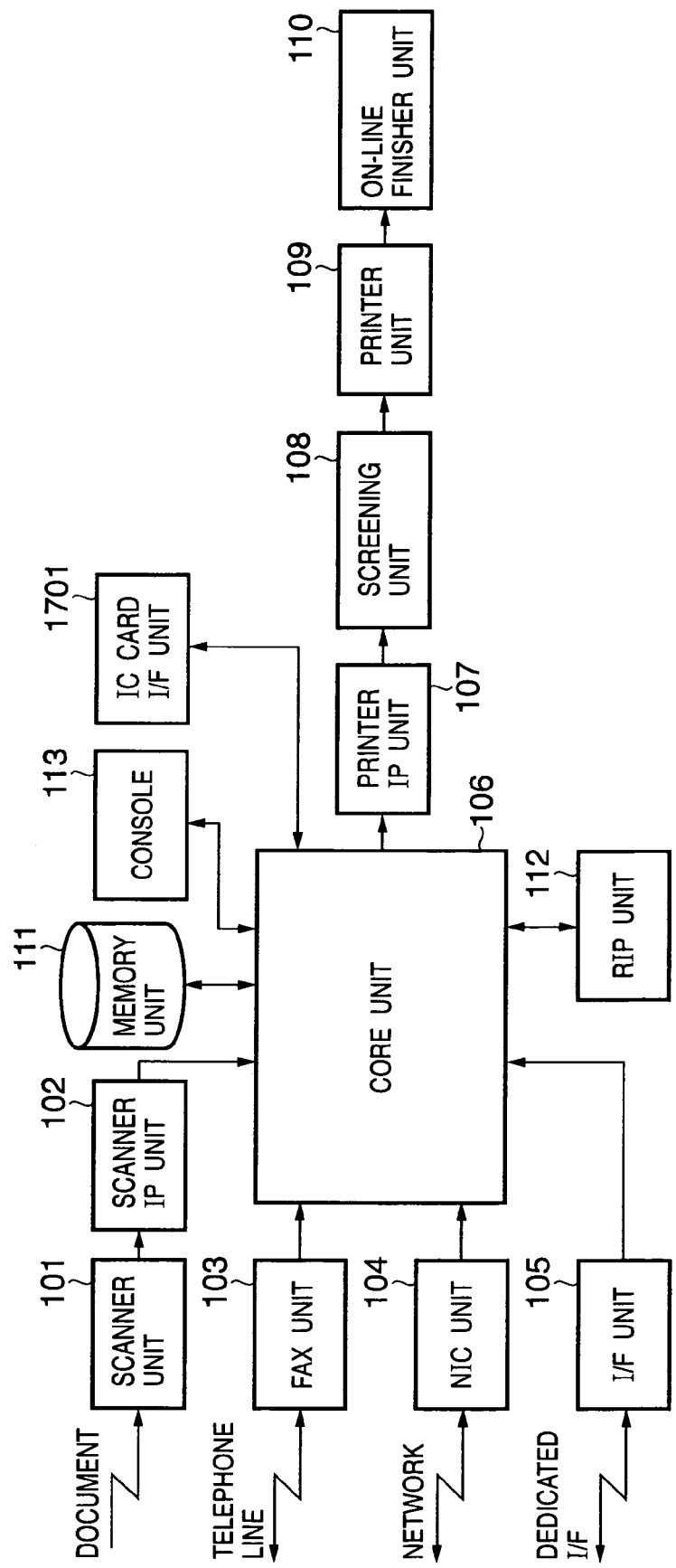
FIG. 17 is a block diagram showing an example of an image forming apparatus according to the embodiment of the present invention.

FIG. 17 is a block diagram showing an example of an image forming apparatus according to the fifth embodiment. The same reference numerals denote blocks common to those in the above embodiments, and a description thereof will be omitted. An IC card I/F unit 1701 is a communication circuit which connects an IC card and transmits/receives information, and is used upon executing operations in collaboration with information of the IC card. Note that the IC card may be either of contact or non-contact type.

For example, when the issuance mode of resident card is selected, the core unit 106 displays on the LCD unit 201 a message that prompts the operator to set the basic resident register card in the IC card I/F unit 1701. When the operator inserts the basic resident register card in the IC card I/F unit 1701, the core unit 106 reads out IC card information such as an identification number or the like via the IC card I/F unit 1701, and accesses an e-government server of, e.g., a city hall to transmit an issuance request of a resident card together with the identification number and the like. Upon reception of data of the resident card or the like from the e-government server, the core unit 106 prints out the resident card or the like via the printer unit 109. The log recording method in this case will be described below.

FIG. 18 shows an example of a log item setting window according to the fifth embodiment. Compared to FIGS. 7A and 7B, "IC card information" 1801 is add as a lower left item on the window. With this item, some of contents stored in the IC card can be selected as log recording items. More specifically, if the "IC card information" 1801 is touched, the core unit 106 generates setting information of log recording items to record IC card information, and stores it in the memory unit 111. When an arbitrary operation mode, which is set to have IC card information as recording items, is executed, the core unit 106 controls the IC card I/F unit 1701 to read out information to be recorded from the IC card and to record that information as a log. Other processes are the same as those in the first or fourth embodiment.

As described above, according to the fifth embodiment, when the operation of the image forming apparatus is executed in collaboration with an IC card such as a basic resident register card or the like, IC card information can be recorded as a log. For example, if the IC card is illicitly used, the IC card used in such illicit use can be easily specified.

Sixth Embodiment

The sixth embodiment allows the operator to select whether or not to agree with log recording when the aforementioned message that notifies log recording is displayed. If the operator does not agree with log recording, processes in the selected operation mode are inhibited.

Figure 19:
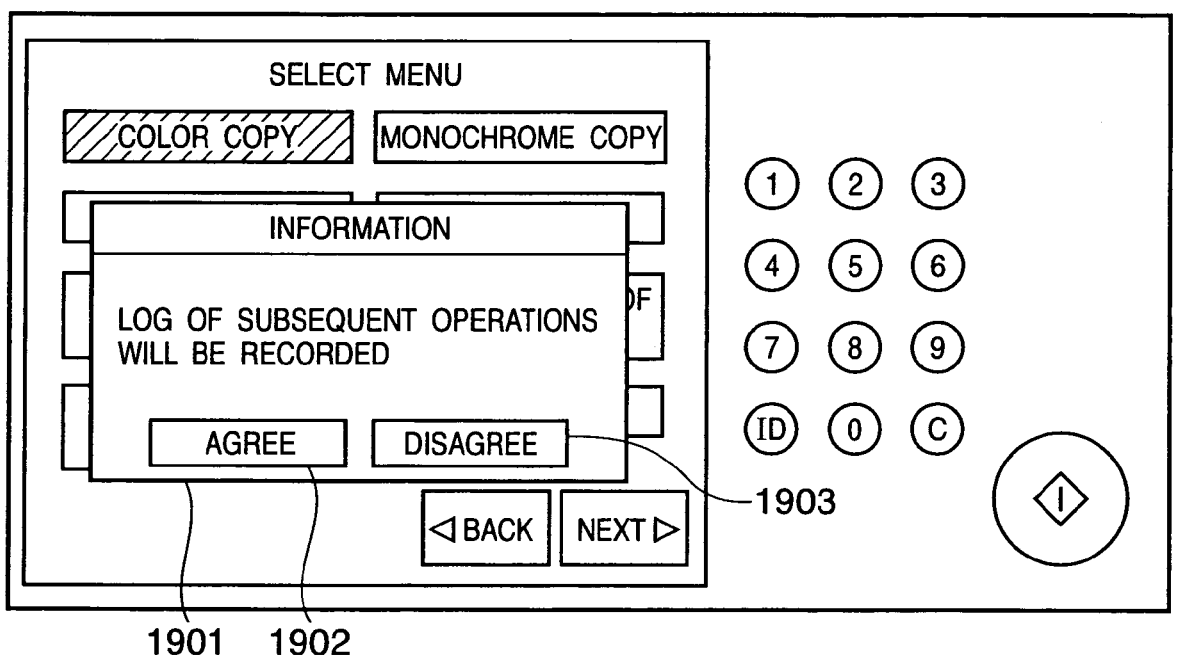
FIG. 19 shows an example of a log recording agreement window according to the embodiment of the present invention.

FIG. 19 shows an example of a log recording agreement window according to this embodiment. In this embodiment, a dialog box 1901 including a message indicating that a log will be recorded, an agree button 1902, and a disagree button 1903 is displayed on the LCD unit 201.

Figure 20:
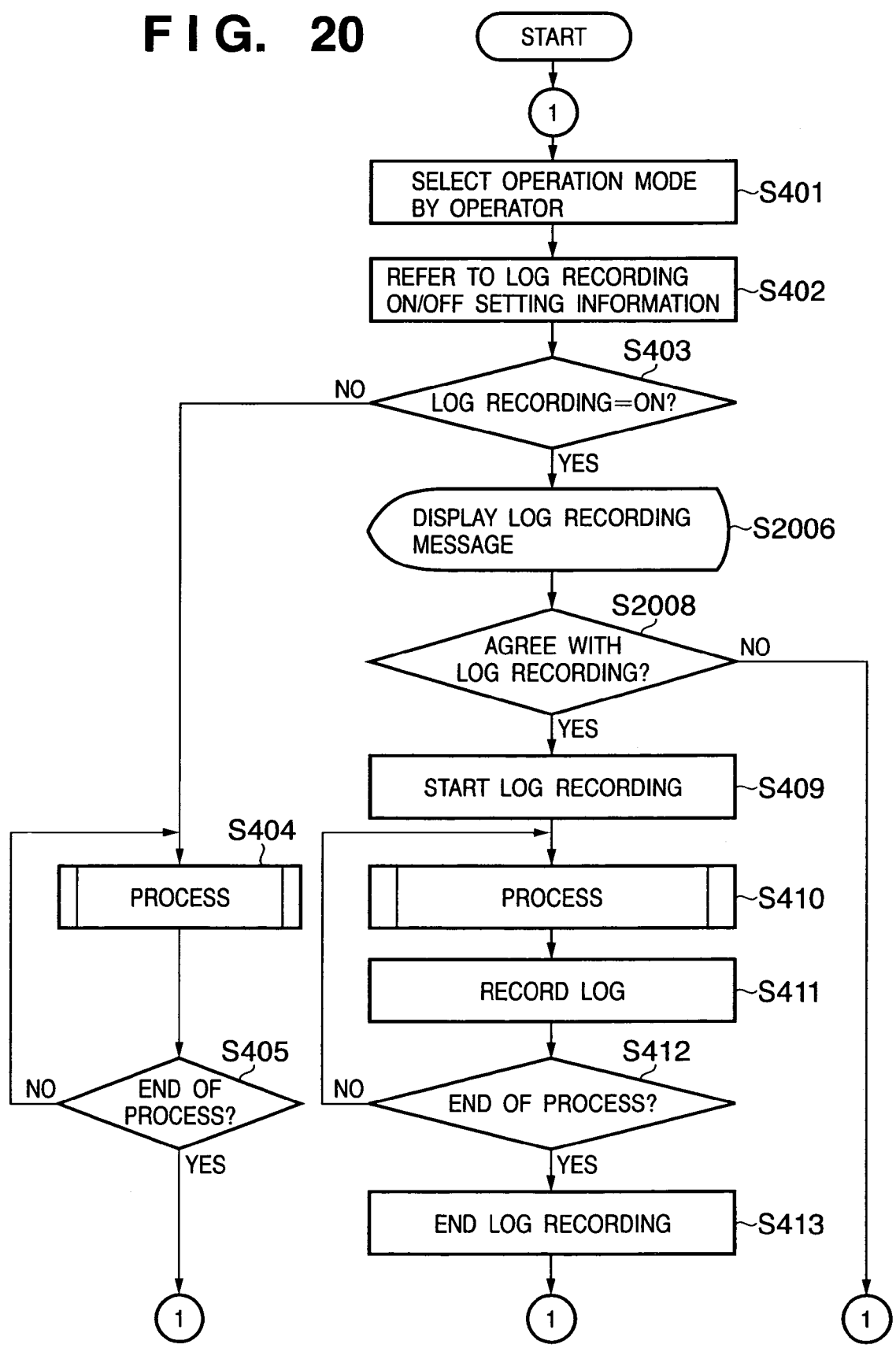
FIG. 20 is a flowchart showing an example of processes associated with selection of an operation mode and log recording according to the embodiment of the present invention.

FIG. 20 is a flowchart showing an example of processes associated with selection of an operation mode and log recording according to the sixth embodiment. As can be seen from comparison with the flowchart of FIG. 4, steps S2006 and S2008 are added.

If it is determined in step S403 that the operation mode which requires log recording is selected, the flow advances to step S2006, and the core unit 106 displays the dialog box 1901 including a message indicating that a log will be recorded, the agree button 1902, and the disagree button 1903 on the LCD unit 201. The operator can select whether or not to agree with log recording by pressing one of the "agree" button 1902 and "disagree" button 1903 on the lower portion of the message window.

The core unit 106 checks in step S2008 based on an operation signal from the console 113 which of the buttons is selected. If it is determined that the agree button 1902 is pressed, the flow advances to step S409. Otherwise, the core unit 106 inhibits execution of the selected operation mode, and displays the window in FIG. 2. Note that the core unit 106 may display a warning message indicating that the operation mode cannot be executed unless the operator agrees with log recording, in addition to the inhibition process.

As described above, according to the sixth embodiment, when the operation mode that requires log recording is selected, and a warning message is displayed, the operator can select whether or not to agree with log recording. Therefore, even when the operator selects a wrong menu and this message is displayed, he or she can abort the process at that time.

Since an ill-intentioned operator, who is about to misbehave with or without the knowledge that a log will be recorded, can recognize that a log will be recorded, an effect of deterring such ill-intentioned operator from making illicit acts can be expected. That is, if such operator presses the "disagree" button 1903, he or she can return from the stage immediately prior to an illicit act. As a result, the effect of deterring such ill-intentioned operator from making illicit acts can be expected.

Other Embodiments

The techniques described in the above embodiments can be appropriately combined within the consistent range. For example, steps S2006 and S2008 in the sixth embodiment can replace step S406 in the second to fifth embodiments.

The log recording file stored in each of the above embodiments may be printed out or transmitted as an e-mail message to the mail address of the administrator when the core unit 106 detects an output instruction from the console 113 or a predetermined timing.

In the above description, the aforementioned message is displayed on the LCD unit 201. Alternatively, the message may be audibly output from a speech output unit (not shown).

The preferred embodiments of the present invention have been explained, and the present invention can be applied to either a system constituted by a plurality of devices, or an apparatus consisting of a single equipment. For example, the present invention may be applied to a scanner, printer, PC, copying machine, MFP, and facsimile apparatus.

Note that the present invention can be achieved by directly or remotely supplying a software program that implements the functions of the aforementioned embodiments (a program corresponding to the flowchart shown in one of FIGS. 4, 6, 8, 14, 16, and 20 in this embodiment) to a system or apparatus, and reading out and executing the supplied program code by a computer of that system or apparatus.

Therefore, in order to make a computer implement the functions and processes of the present invention, the program code itself installed in the computer implements the present invention. That is, the computer program itself that implements the functions and processes is one aspect of the present invention.

In this case, the form of program is not particularly limited, and an object code, a program to be executed by an interpreter, script data to be supplied to an OS, and the like may be used as along as they have the program function.

As a recording medium for supplying the program, for example, a flexible disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, with the arrangement of the present invention, for example, problems of the prior arts can be prevented. In addition, some sense of security can be given to authentic users upon using an image forming apparatus and use of an image forming apparatus by illicit users can be deterred. Also, with the arrangement of the present invention, for example, both the security and convenience upon using the image forming apparatus can be realized at the same time. Furthermore, since the operator can select whether or not to store an operation history for each operation mode, log recording of an operation of an operation mode which is less necessary upon recording the operation history can be skipped.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-427702 filed on Dec. 24, 2003, which is hereby incorporated by reference herein.

What is claimed is:

1. An image forming apparatus having a plurality of operation modes, comprising:
   a memory unit configured to store information indicating whether or not to store an operation history, each of the information corresponding to any one of the operation modes;
   a designation unit configured to designate an operation mode from the plurality of operation modes;
   a determination unit configured to determine, based on the information stored in said memory unit, whether or not to store an operation history in accordance with an operation of the designated operation mode; and
   an operation history storage unit configured to store the operation history in accordance with an operation of the designated operation mode;
   an agreement request unit configured to, in a case where said determination unit determines to store the operation history, request an agreement about storage of the operation history; and
   a control unit configured to cause said operation history storage unit to store the operation history and permit execution of the designated operation mode under a condition that storage of the operation history is agreed, and to inhibit execution of the designated operation mode when storage of the operation history is not agreed.

2. The apparatus according to claim 1, further comprising a display unit configured to, in the case where said determination unit determines to store the operation history, displaying a message indicating that the operation history is going to be stored.

3. The apparatus according to claim 1, further comprising an item setting unit configured to set at least one item to be stored as the operation history commonly for all or some of the plurality of operation modes or independently for each of the plurality of operation modes, and wherein said operation history storage unit stores only the item set for the designated item as the operation history.

4. The apparatus according to claim 3, further comprising a level setting unit configured to set a plurality of storage levels upon storing the operation histories and setting the plurality of storage levels to store different numbers of items as the operation history, and wherein said operation history storage unit stores the operation history in accordance with the storage level set for the designated operation mode.

5. The apparatus according to claim 1, further comprising a reading unit configured to read contents stored in an IC card, wherein said operation history storage unit stores the contents read from the IC card as the operation history.

6. An operation history storage method for an image forming apparatus having a plurality of operation modes, comprising:
a step of storing information indicating whether or not to store an operation history based on the selection, the information corresponding to any one of the operation modes;
a step of designating an operation mode from the plurality of operation modes;
a step of determining, based on the stored information, whether or not to store an operation history in accordance with an operation of the designated operation mode; and
an operation history storage step of storing, in the case where storing the operation history is determined, the operation history in accordance with an operation of the designated operation mode;
a step of requesting, in a case where said determination unit determines to store the operation history, an agreement about storage of the operation history; and
a step of causing the operation history to be stored and permitting execution of the designated operation mode under a condition that storage of the operation history is agreed, and inhibiting execution of the designated operation mode when storage of the operation history is not agreed.

7. The method according to claim 6, further comprising a step of displaying, in the case where storing the operation history is determined, a message indicating that the operation history is going to be stored.

8. The method according to claim 6, further comprising a step of setting at least one item to be stored as the operation history commonly for all or some of the plurality of operation modes or independently for each of the plurality of operation modes, and wherein the operation history storage step includes a step of storing only the item set for the designated item as the operation history.

9. The method according to claim 8, further comprising a level setting step of setting a plurality of storage levels upon storing the operation histories and setting the plurality of storage levels to store different numbers of items as the operation history, and wherein the operation history storage step includes a step of storing the operation history in accordance with the storage level set for the designated operation mode.

10. The method according to claim 6, further comprising:
a step of reading contents stored in an IC card; and
a step of storing the contents read from the IC card as the operation history.

11. A computer readable storage medium storing a computer-executable program for executing an operation history storage method of claim 6.

12. An image forming apparatus having a plurality of operation modes, comprising:
a display unit configured to display at least information associated with the operation modes;
a display control unit configured to make display control that controls said display unit to display a designation window used to designate a desired operation mode from the plurality of operation modes;
a memory unit configured to store information indicating whether or not to store an operation history, the information corresponding to any one of the operation modes;
a determination unit configured to determine, based on the information stored in said memory unit, whether or not to store an operation history in accordance with an operation of the designated operation mode; and
an operation history storage unit configured to store the operation history, storing the operation history in accordance with an operation of the designated operation modes;
an agreement request unit configured to, in a case where said determination unit determines to store the operation history, request an agreement about storage of the operation history: and
a control unit configured to cause said operation history storage unit to store the operation history and permit execution of the designated operation mode under a condition that storage of the operation history is agreed, and to inhibit execution of the designated operation mode when storage of the operation history is not agreed.

13. The apparatus according to claim 12, further comprising warning display unit configured to, in the case where said determination unit determines to store the operation history, displaying a warning indicating that the operation history is going to be stored.

14. The apparatus according to claim 12, further comprising an item display unit configured to display an item setting window used to set at least one item to be stored as the operation history commonly for all or some of the plurality of operation modes or independently for each of the plurality of operation modes, and wherein said operation history storage unit stores only the item set for the designated item as the operation history.

15. The apparatus according to claim 14, further comprising a level display unit configured to set a plurality of storage levels upon storing the operation histories and displaying a window used to set the plurality of storage levels to store different numbers of items as the operation history, and wherein said operation history storage unit stores the operation history in accordance with the storage level set for the designated operation mode.

16. An operation history storage method for an image forming apparatus having a plurality of operation modes, comprising:
a display step of displaying at least information associated with the operation modes;
a step of storing information indicating whether or not to store an operation history based on the selection, the information corresponding to any one of the operation modes;
a step of displaying a window used to designate an operation mode from the plurality of operation modes;
a step of determining, based on the stored information, whether or not to store an operation history in accordance with an operation of the designated operation mode; and
an operation history storage step of storing the operation history in accordance with an operation of the designated operation mode;
a step of requesting, in a case where said determination unit determines to store the operation history, an agreement about storage of the operation history; and
a step of causing the operation history to be stored and permitting execution of the designated operation mode under a condition that storage of the operation history is agreed, an inhibiting execution of the designated operation mode when storage of the operation history is not agreed.

17. The method according to claim 16, further comprising a step of displaying, in the case where storing the operation history is determined, a warning indicating that the operation history is going to be stored.

18. The method according to claim 16, further comprising a step of displaying an item setting window used to set at least one item to be stored as the operation history commonly for all or some of the plurality of operation modes or independently for each of the plurality of operation modes, and wherein the operation history storage step includes a step of storing only the item set for the designated item as the operation history.

19. The method according to claim 18, further comprising a step of setting a plurality of storage levels upon storing the operation histories and displaying a window used to set the plurality of storage levels to store different numbers of items as the operation history, and wherein the operation history storage step includes a step of storing the operation history in accordance with the storage level set for the designated operation mode.

20. An image forming apparatus having a plurality of operation modes including at least an operation mode for performing a print process of input image data, and an operation mode for transmitting input image data to an external apparatus, comprising:
a memory unit configured to store information indicating whether or not to store an operation history based on the selection, the information corresponding to any one of the operation modes;
a determination unit configured to, when an operator designates an operation mode to be executed from the plurality of operation modes, determine whether or not to store an operation history in accordance with an operation of the designated operation mode based on the stored information;
a notification unit configured to notify the operator of a message indicating that log information is going to be recorded in the case where storing an operation history is determined; and
a control unit configured to permit execution of the designated operation mode under a condition that the operator agrees with recording of the log information, and to inhibit execution of the designated operation mode when the operator does not agree with recording of the log information.

21. A control method suited to an image forming apparatus having a plurality of operation modes including at least an operation mode for performing a print process of input image data, and an operation mode for transmitting input image data to an external apparatus, the method comprising the steps of:
storing information indicating whether or not to store an operation history, the information corresponding to any one of the operation modes;
determining, when an operator designates an operation mode to be executed from the plurality of operation modes, whether or not to store the operation history in accordance with an operation of the designated operation mode based on the stored information;
notifying the operator of a message indicating that log information is going to be recorded in a case where storing the operation history is determined; and
controlling to permit execution of the designated operation mode under a condition that the operator agrees with recording of the log information, and to inhibit execution of the designated operation mode when the operator does not agree with recording of the log information.

22. The method according to claim 21, further comprising:
controlling, when the operator designates the operation mode to be executed, a console to execute a first display process for notifying the operator of the message indicating the log information is going to be recorded;
permitting, when the console is controlled to execute the first display process and the operator makes an input indicating agreement about recording of the log information via the console, execution of the designated operation mode; and
inhibiting, when the console is controlled to execute the first display process and the operator does not make any input indicating agreement about recording of the log information via the console, execution of the designated operation mode.

23. The method according to claim 21, further comprising:
controlling, when the operator designates the operation mode to be executed, a console to execute a first display process for notifying the operator of the message indicating the log information is going to be recorded, to execute a second display process for inputting a first instruction required to input agreement associated with recording of the log information, and to execute a third display process for inputting a second instruction required to input disagreement associated with recording of the log information;
permitting, when the first display process is executed, and the first instruction is input in association with the second display process, execution of the designated operation mode; and
inhibiting, when the first display process is executed, and the second instruction is input in association with the third display process, execution of the designated operation mode.

24. The method according to claim 21, further comprising:
controlling a console of the image forming apparatus to execute the first, second, and third display processes.

25. The method according to claim 21, further comprising:
controlling a console of an external apparatus that outputs image data which can be printed by the image forming apparatus to the image forming apparatus to execute the first, second, and third display processes.

26. An image forming apparatus having a plurality of operation modes including first and second operation modes, comprising;
a memory adapted to store information indicating that an operation history according to an operation of the first operation mode is to be stored;
a selector adapted to select one of the plurality of operation modes; and
a controller adapted to request an agreement about storage of the operation history and permit said image forming apparatus to execute the first operation mode under a condition that storage of the operation history is agreed when said selector selects the first operation mode, and to permit said image forming apparatus to execute the second operation mode without requesting the agreement about storage of the operation history when said selector selects the second operation mode.

27. A control method for an image forming apparatus which can selectively execute a plurality of operation modes including first and second operation modes, comprising:
   a step of storing information indicating that an operation history according to an operation of the first operation mode is to be stored;
   a step of requesting an agreement about storage of the operation history and permitting the image forming apparatus to execute the first operation mode under a condition that storage of the operation history is agreed when the first operation mode is selected; and
   a step of permitting the image forming apparatus to execute the second operation mode without requesting the agreement about storage of the operation history when the second operation mode is selected.

* * * * *

UNITED STATES PATENT AND TRADEMARK OFFICE
CERTIFICATE OF CORRECTION

| | |
|---|---|
| PATENT NO. | : 7,270,271 B2 |
| APPLICATION NO. | : 11/011213 |
| DATED | : September 18, 2007 |
| INVENTOR(S) | : Yokoyama |

It is certified that error appears in the above-identified patent and that said Letters Patent is hereby corrected as shown below:

TITLE PAGE:
Item (30) Foreign Application Priority Data, "Dec. 24, 2002" should read -- Dec. 24, 2003 --.

COLUMN 1:
Line 38, "record" should read -- records --.

COLUMN 3:
Line 40, "an" should read -- a --; and
Line 63, "operation" should read -- the operation --.

COLUMN 5:
Line 43, "administrator's" should read -- an administrator's --.

COLUMN 6:
Line 42, "methods" should read -- method --.

COLUMN 7:
Line 64, "and windows" should read -- and the window --.

COLUMN 9:
Line 27, "windows" should read --the window --.
Line 28, "and windows" should read -- and the window --; and
Line 30, "and" windows" should read -- and the window --.

UNITED STATES PATENT AND TRADEMARK OFFICE
CERTIFICATE OF CORRECTION

PATENT NO. : 7,270,271 B2
APPLICATION NO. : 11/011213
DATED : September 18, 2007
INVENTOR(S) : Yokoyama It is certified that error appears in the above-identified patent and that said Letters Patent is hereby corrected as shown below:

COLUMN 10:
Line 47, "windows" should read -- the window --; and
Line 54, "displays a" should read -- displays --.

COLUMN 11:
Line 2, "have" should read -- has --; and
Line 49, "add" should read -- added --.

Signed and Sealed this

Third Day of June, 2008

JON W. DUDAS
*Director of the United States Patent and Trademark Office*